April 24, 1973 C. E. MONSEES 3,729,359
CONTINUOUS TUBE SEALER
Filed April 30, 1971 2 Sheets-Sheet 1

INVENTOR
CLAUDE E. MONSEES
BY Bacon & Thomas
ATTORNEYS

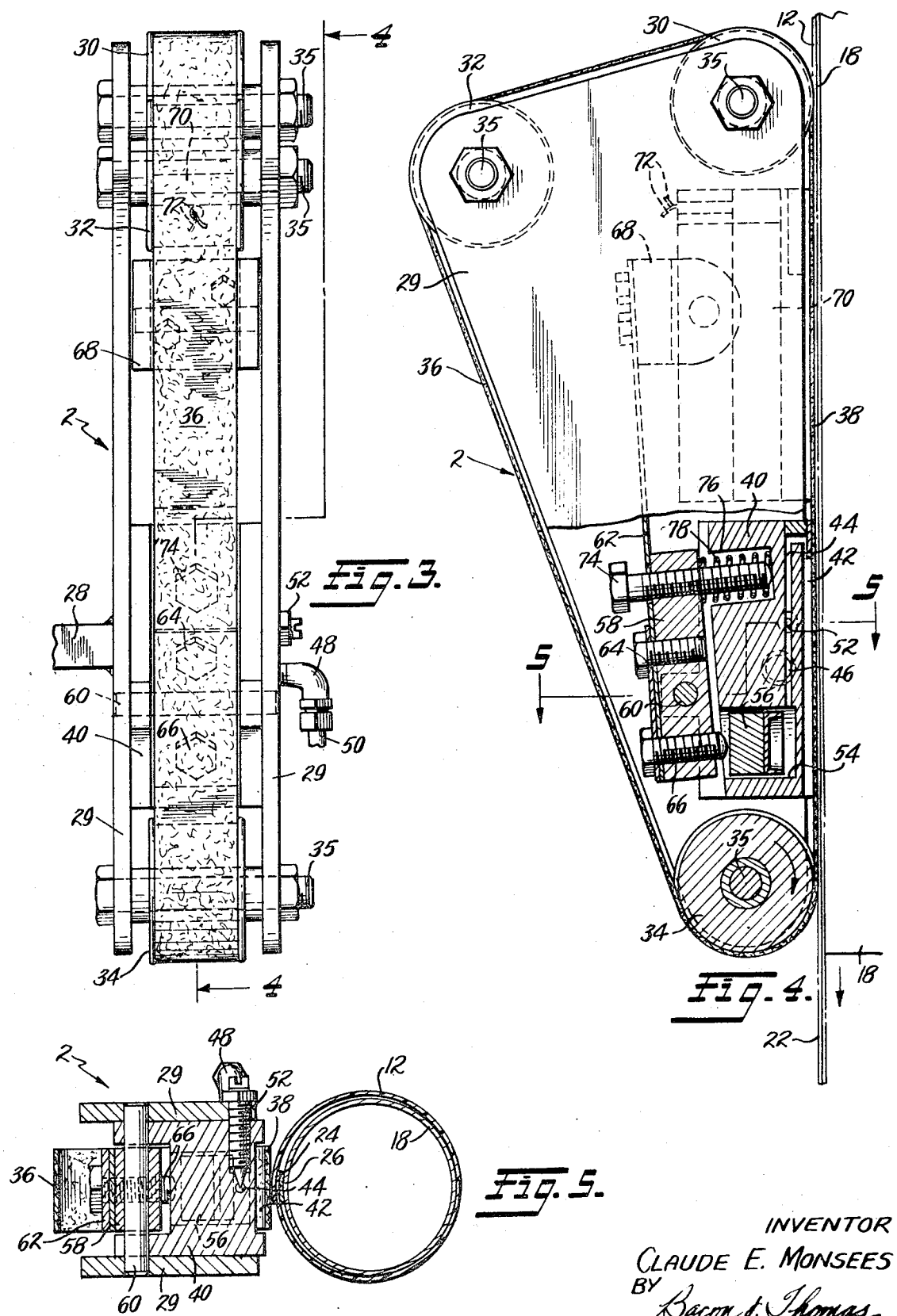

United States Patent Office 3,729,359
Patented Apr. 24, 1973

3,729,359
CONTINUOUS TUBE SEALER
Claude E. Monsees, Durham, N.C., assignor to Wright Machinery Company, Inc., Durham, N.C.
Filed Apr. 30, 1971, Ser. No. 138,981
Int. Cl. B29d 23/10
U.S. Cl. 156—466
9 Claims

ABSTRACT OF THE DISCLOSURE

A tube former directs a web of unsupported polyethylene film into tubular form about a cylindrical mandrel with its longitudinal edges overlapping. An endless belt of Teflon impregnated Fiberglas is trained over idler pulleys to a run along the overlapped edges and a heater device heats the belt and film to fuse the overlapped edges and cause them to adhere to each other and to the belt so that the belt is pulled along as the tube is drawn along the mandrel. Cooling means then cools the belt and film and one of the idler pulleys strips the belt from the sealed tube. The heater is moved to and from the belt under the control of the cooling means.

BACKGROUND OF THE INVENTION

This invention is in the field of bag forming and filling apparatus particularly for forming continuous tubular bag material and heat sealing a longitudinal seam thereon in a continuous operation.

Machines are in common use wherein a web of thermoplastic material is fed through a forming device to form the web into a continuous tube with overlapping longitudinal edge portions to form a tube from which packages are made. Customarily, the material is intermittently drawn through the former and while stationary, a suitable heat sealing device forms a length of sealed seam. It is becoming more common to construct such machines wherein the web material is drawn continuously through the former, without stopping, and a continuous sealing apparatus becomes necessary. It is also desirable to employ polyethylene for the bag material, due to its desirable characteristics. However, such material is extremely difficult to heat seal due to the fact that it melts so readily and becomes very sticky, thus adhering to the heat sealing apparatus. To incorporate such material in bags it has been the custom to provide a film of polyethylene on a carrier film of different material not having the same melting or sticky characteristics of polyethylene itself and heat sealing was accomplished through the carrier material, thus eliminating the problems of sticking. However, heretofore no successful method has been employed for forming bags and heat sealing the same wherein the material is an unsupported film of polyethylene.

SUMMARY OF THE INVENTION

The present invention contemplates apparatus for continuously sealing a longitudinal seam in a tube of unsupported polyethylene and comprises an endless belt engageable with the overlapped edges of the web material and heating means for heating the belt and the overlapped seam to fuse the latter. Adhesion of the fused material to the belt creates a frictional bond therebetween whereby movement of the formed tube along a supporting mandrel also drives the endless belt to move therewith. A cooling device located downstream of the belt from the heater cools the belt and the fused material and the belt is then trained over an idler pulley to strip the same from the sealed tube while the latter is still supported by its mandrel. The cooling is accomplished by means of a stream of air, the pressure of which is also utilized to press the heater against the endless belt with controllable pressure and to effect withdrawal of the heater from contact with the belt when cooling is not being accomplished, that is, when no air is being supplied, such as during shutdown or other stoppage of the machine.

BRIEF DESCRIPTION OF THE DRAWINGS

FIG. 3 is a front elevational view, on an enlarged scale, of the continuous sealing apparatus of the present invention;

FIG. 4 is a vertical sectional view taken substantially along the line 4—4 of FIG. 3; and FIG. 5 is a transverse sectional view taken substantially along the line 5—5 of FIG. 4.

DESCRIPTION OF A PREFERRED EMBODIMENT

Figure 1:
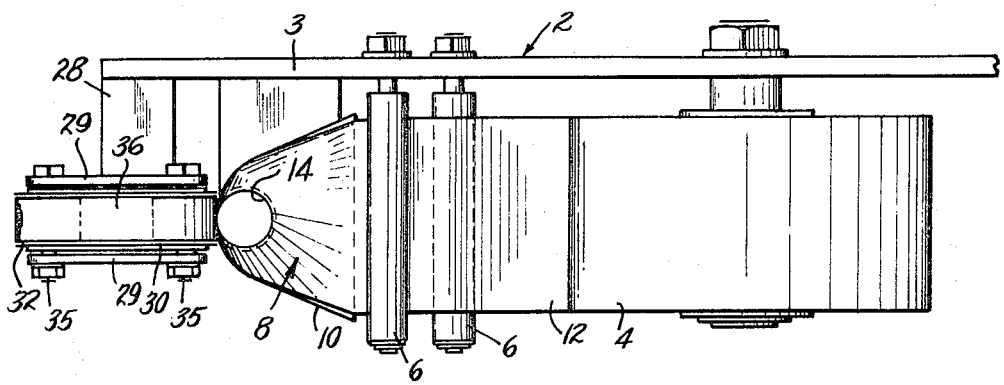
FIG. 1 is a top plan view of a schematic representation of a bag forming machine and continuous seam sealer embodying the present invention.
Figure 2:
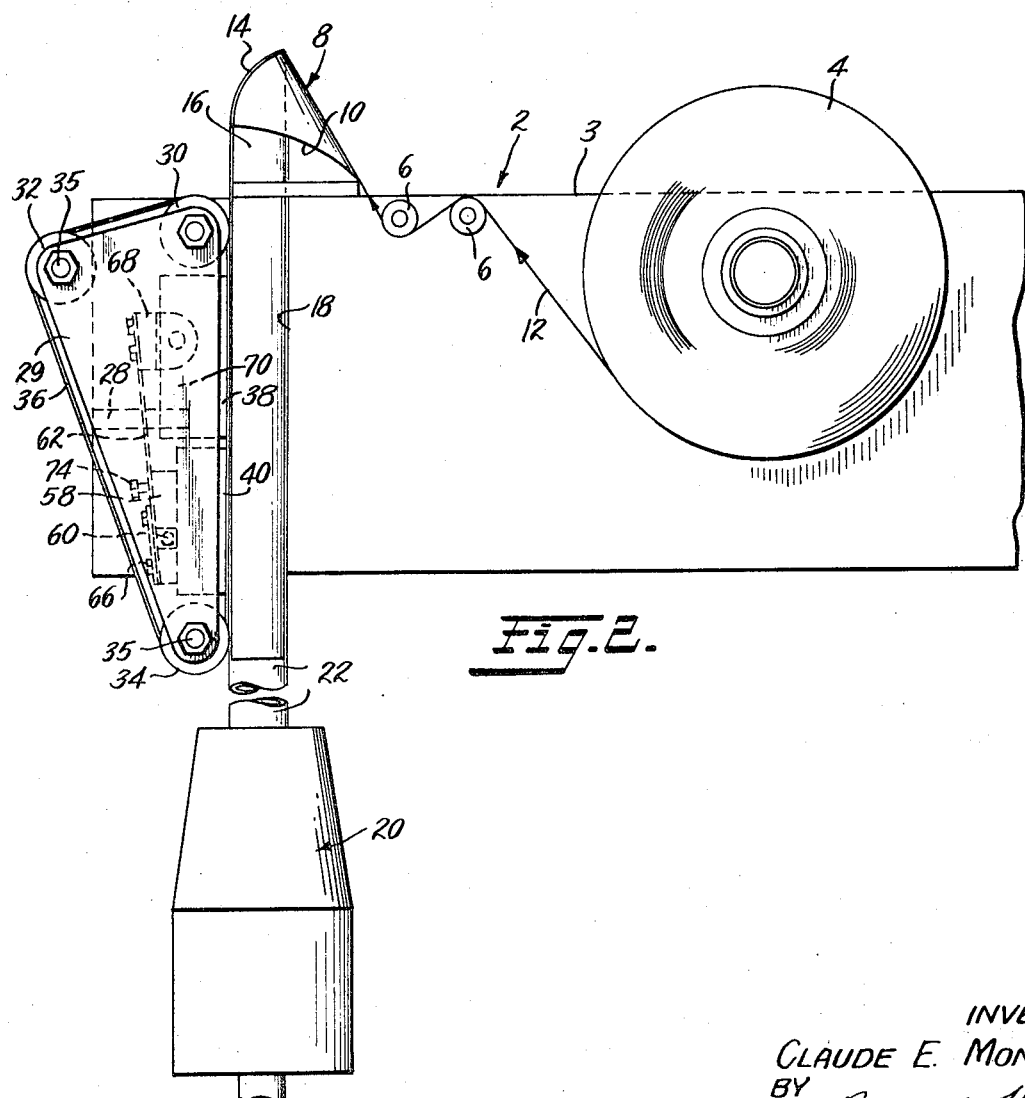
FIG. 2 is a side elevational view of the apparatus shown in FIG. 1.

Referring first to FIGS. 1 and 2, numeral 2 designates generally a bag forming machine wherein a roll 4 of bag forming web material is rotatably supported on a frame, indicated at 3, and wherein the film 12 from said roll is trained over suitable guide pulleys 6 to a tube former 8 of known construction. In general, the tube former 8 comprises a wing or collar configuration 10 that guides and directs the film 12 over a reversing edge 14 to the interior surface of a tubular member 16. A hallow tubular mandrel 18 is suitably supported on the apparatus and is of a diameter to receive the tubular material formed by the former 8, on the exterior surface thereof. Opposed lateral edges of the web 12 are overlapped by the former 8 and remain overlapped as they move along the outer surface of mandrel 18. (See FIG. 5).

Numeral 20 schematically indicates any suitable mechanism for continuously drawing the formed tube 22 through the forming apparatus and may include means for cross-sealing the tube 22 between charges of material deposited therein through the tubular member 18. The apparatus thus far described may be considered conventional and known to the prior art.

As previously stated, it is in many cases, highly desirable to employ an unsupported polyethylene film as the material 12, but the problems in heat sealing such material have heretofore prevented such use in a machine of this type.

According to the present invention means are provided for continuously sealing the overlapped edges of such a film 12 to form the tube 22 and include the following features.

As shown in FIG. 5, that side of the mandrel 18 against which the overlapped edges 24 slide is provided with a strip 26 of high temperature resistant foam rubber covered by a pressure sensitive tape of polytetrafluoroethylene, known by the tradename Teflon. Such a surface provides a low-friction support for the sliding tube material.

Adjacent the mandrel 18 and outwardly of the strip 26, a suitable support 28 is provided on which a pair of spaced plates 29 are mounted and between which a plurality of idler rollers 30, 32 and 34 are journalled for free rotation on axles 35 which also serve as supporting spacers for the plates 29. An endless belt 36 is loosely trained over and guided by the rollers 30–34, which are arranged to direct the belt 36 along a straight belt run 38 extending along and in close proximity to the strip 26, previously described. When tube forming material is being drawn over the mandrel, the overlapped edges thereof contact both the strip 26 and the run 38 of belt 36.

Refer next to FIGS. 3 and 4, showing the novel apparatus on an enlarged scale. As shown therein, a blocklike member 40 is suitably mounted between the plates 29 closely adajacent the inner surface of the loop defined by the belt 36 and adjacent that surface of the belt, on run 38, directly opposite the strip 26 on mandrel 18. The face of the member 40 adjacent the belt 36 is provided with a recess 42 with which a passageway 44 communicates. The passageway 44 also communicates with an inlet portion 46 to which air is delivered, by any suitable pump means through a fitting 48 (FIG. 3) and a suitable conduit 50. An adjustable needle valve 52 is arranged to control the effective sectional area of the passage 44, between the inlet 46 and recess 42. The passage 44 also extends from the inlet 46 to a cylinder chamber 54 in the member 40. Within this chamber is a piston 56 slidable therein.

A carrier member 58 is pivotally mounted between the plates 29 adjacent member 40, on an axis defined by pin 60. A leaf spring 62 is secured to the carrier 58 by such means, for example, as the screws 64 and 66. As shown, the screw 66 extends through an end portion of the carrier 58 and extends into the cylinder chamber 54 whereby it may be engaged by the piston 56. At its upper free end the leaf spring 66 is provided with a suitable yoke 68 fixed thereon and on which a heater device 70 is pivotally mounted. The heater device is a heat conducting body of material having a suitable heating element therein, provided with electric current through suitable leads 72. It is also contemplated that a temperature controlling device be incorporated in the heater 70, whereby the temperature thereof may be maintained at a desired value. The heater device 70 is formed with a surface adjacent the run 38 of belt 36 and which may be frictionally engaged with the inner surface of the belt. Screw abutment 74 is shown as being threadedly engaged with the carrier 58 and extending into a recess 76 in member 40 to a position wherein its inner end may engage or abut against the bottom surface of the recess 76. A compression spring 78 bears against the bottom of the recess 76 and against the carrier 58 thereby constantly biasing the carrier 58 to pivot about pin 60 in a counterclockwise direction, as seen in FIG. 4. Such pivotal movement of the carrier 58 moves the heater device 70 away from the belt 36 and out of contact therewith.

The belt 36 is preferably formed of fiberglas impregnated with the previously mentioned Teflon material and may be of the order of .005 of an inch thick.

In operation, it is to be assumed that the tubular bag material constituting the tube 22 is being constantly drawn downwardly over the mandrel 18 with the overlapped edges thereof sliding along the strip 26. When the machine is in operation, electric current is supplied to the heating device 70 to heat the same and it is held in contact with the belt 36. The belt acts as a heat transfer medium to transfer heat therethrough to the overlapped edges of the tube material 12 in sufficient amount to substantially melt the outer ply thereof and cause the same to fuse with the underlying polyethylene, to form an impervious longitudinal seal. As previously stated, the heated and substantially melted polyethylene material is quite sticky and it adheres to the belt 36 when so heated. This adhesion creates a frictional bond between the material 12 and belt 36 so that downward movement of the tube 22 on mandrel 18 also causes the run 38 of the belt to move therewith, the idler rollers 30–34 being free to rotate and permit the belt to so travel. During operation, air under suitable pressure, is supplied to the inlet 46 in member 40 and some of that air follows passage 44 to the recess 42 and is discharged adjacent the inner surface of belt 36 whereupon the belt and the underlying fused seam on the tube 12 are cooled, the latter cooling to a substantially solid state. Under these conditions, however, the polyethylene material still adheres somewhat to the belt 36 but as the tube 12 and the belt move downwardly, the latter being trained over pulley 34 is stripped from the fused seam. It is to be noted that the roller 34 is above the lower end of mandrel 18 and thus the mandrel holds the sealed tube while the belt is being stripped therefrom.

During the above described operation, it is assumed that the needle valve 52 has been adjusted to permit the desired or necessary quantity of air to be discharged against the belt 36 to cool the same the required amount. At the same time the needle valve 52 defines a restriction in the passage 44, thus creating a back pressure in chamber 54 acting on piston 56. This air pressure on piston 56 is transmitted to the screw 66 and thus to the carrier 58, urging the latter to pivot in a clockwise direction sufficiently to hold the surface of the heater device 70 against belt 38. The abutment screw 74 may be adjusted to permit the desired flexure of leaf spring 62, under these conditions, and thereby regulate the pressure with which the heater device 70 is pressed against the belt 36.

Compressed air is supplied through the conduit 50 to the inlet 46 by any suitable mechanism but it is contemplated that a control valve or the like be provided so that air is supplied to the inlet 46 only when the apparatus is in operation. When the machine is not in operation, that is, any time the web material is not moving along the mandrel 18, no air is supplied by the conduit 50 and, therefore, no air pressure is applied to the piston 56. The compression spring 78 then holds the heater device 70 in a retracted position out of contact with the belt 36 and no heat is transmitted to any web material then on the mandrel. Obviously, continued transfer of heat to the web material when the latter is stationary would result in complete melting of the material adjacent the heater and obvious fouling of the apparatus.

For the apparatus described to operate successfully on unsupported polyethylene film, it is necessary that the temperature of the heating device 70 and the speed of movement of the web material 12 be accurately related so that heat is transferred from the device 70 to the film only in such quantity and at such rate as to substantially completely melt the outer ply of the overlapped edges and to substantially melt only the outer surface portion of the inner ply thereof, to a depth not exceeding about one-half the thickness of the film. If the entire inner ply were heated to its fusion temperature, it would obviously adhere to the strip 26 and the apparatus could not operate successfully. On the other hand, if the outer surfaces of the inner ply were not heated to substantially its fusion temperature, a satisfactory seal could not be obtained. Means for accurately and precisely controlling the rate of heat production in the device 70 and its rate of transfer to the film 12 are common and well known to those skilled in the art and need not be described in detail.

If desired, the tublular mandrel 18 may be replaced by a solid or other back-up bar extending within and along one side of the formed tube and engaging only the overlapped edges 24. Also, fixed track means or guide plates may be employed to guide the belt 36 around its closed loop instead of the rollers shown.

While a single specific embodiment of the invention has been shown and described herein, the same is merely illustrative of the principles involved and the scope of applicant's patent is to be limited only by the scope of the appended claims.

I claim:

1. Continuous tube forming and sealing apparatus, comprising;
   a hollow cylindrical tubular back-up member;
   means for directing a web of thermoplastic material into the form of a tube around said back-up member with the edges of said tube in overlapping relation and extending slidably along one side of said member and means for moving said tube along said member;
   an endless belt of a material to which said thermoplastic material will adhere when heated and idler roller guide means guiding said belt along a closed path having a run thereof extending along and closely adjacent to said one side of said member;

a heating device adjacent the surface of said belt run opposite said member and arranged to heat said belt and thereby heat and fuse said overlapping edges and cause said thermoplastic material to adhere to said belt whereby movement of said tube along said member causes said belt to move therewith;

cooling means adjacent said belt, spaced from said heating device in the direction of belt and tube movement, for cooling said belt and hardening said fused overlapping edges; and stripping means adjacent said member for stripping said belt from said tube.

2. Apparatus as defined in claim 1 wherein said one side of said member is provided with a strip of resilient material having an outer surface of polytetrafluoroethylene slidably engageable with said tube.

3. Apparatus as defined in claim 1 wherein said heating device is movably mounted for selective movement toward and from said belt;

means normally biasing said heating device away from said belt; and means responsive to operation of said cooling means for moving said heating device to said belt.

4. Continuous heat sealing apparatus comprising:

a support;

guide means mounted on said support;

an endless belt trained over said guide means and defining a closed loop having at least one straight run portion;

a heating device mounted on said support, within said loop, for movement to and from said straight run portion adjacent one end thereof;

a cooling member on said support, within said loop and adjacent the other end of said straight run portion;

cooling means for cooling said member and the adjacent portion of said belt; and actuating means responsive to operation of said cooling means for moving said heating means to said belt and for holding said heating device against said belt.

5. Apparatus as defined in claim 4 wherein said cooling means comprises means for directing a stream of air through said member and onto said belt; said actuating means comprising a pneumatically operable mechanism responsive to the pressure of said stream of air in said member.

6. Apparatus as defined in claim 4 including resilient means normally urging said heating device to move away from said belt.

7. Apparatus as defined in claim 4 including a carrier pivotally mounted on said apparatus and a leaf spring secured to said carrier and to said heating device for supporting the same whereby said device is mounted for pivotal movement to and from said belt; and adjustable stop means for limiting pivotal movement of said carrier in a dispersion to move said device toward said belt, said actuating means being operatively connected to said carrier.

8. Apparatus as defined in claim 7 wherein said member comprises a block having an air passage therethrough for directing a stream of air from an inlet to an outlet adjacent said belt, a cylinder chamber in said block in communication with said passage, and an adjustable valve in said passage for regulating flow of air to said outlet, said inlet communicating with said passage between said chamber and said valve; said actuating means comprising a piston in said cylinder chamber drivingly engageable with said carrier.

9. Apparatus as defined in claim 4 wherein said guide means comprises a plurality of idler rollers journalled on said support.

References Cited

UNITED STATES PATENTS

| 3,388,017 | 6/1968 | Grimsler et al. | 156—466 X |
| 3,536,567 | 10/1970 | Harrison | 156—498 |
| 3,591,441 | 6/1971 | Nelson | 156—498 |

EDWARD G. WHITBY, Primary Examiner

U.S. Cl. X.R.

156—498, 583